United States Patent [19]

Hölscher et al.

[11] Patent Number: 5,599,154
[45] Date of Patent: Feb. 4, 1997

[54] HIGH-RISE SHELVING

[75] Inventors: Jürgen Hölscher, Königstein; Adrian J. Siegler, Bellheim, both of Germany

[73] Assignee: Bellheimer Metallwerk GmbH, Pfalz, Germany

[21] Appl. No.: 411,340

[22] Filed: Mar. 27, 1995

[30] Foreign Application Priority Data

Apr. 19, 1994 [DE] Germany .................. 44 16 103.4

[51] Int. Cl.⁶ .................................. B65G 1/04
[52] U.S. Cl. .............. 414/278; 414/277; 414/268; 414/331
[58] Field of Search ................... 414/267, 268, 414/277, 278, 331; 198/365, 782

[56] References Cited

U.S. PATENT DOCUMENTS

| | | | |
|---|---|---|---|
| 3,520,427 | 7/1970 | Offen | 414/535 |
| 3,718,097 | 6/1971 | La Tourneau et al. | 414/277 X |
| 5,149,240 | 9/1992 | Di Rosa | 414/277 |
| 5,156,514 | 10/1992 | Zah | 414/278 |

FOREIGN PATENT DOCUMENTS

| | | | |
|---|---|---|---|
| 255144 | 3/1988 | Germany | 414/278 |
| 4233688 | 4/1994 | Germany . | |
| 4233690 | 4/1994 | Germany . | |
| 62-105825 | 5/1987 | Japan | 414/278 |
| 678940 | 11/1991 | Switzerland | 414/278 |

*Primary Examiner*—Karen B. Merritt
*Assistant Examiner*—Stephen Gordon
*Attorney, Agent, or Firm*—Mark P. Stone

[57] ABSTRACT

In a high-rise shelving having two shelving columns (2, 3) and a vertical conveyor (6) disposed therebetween, the bases (9) of shelf-racks (7), which shelf-racks can be transferred by the vertical conveyor (6) into the compartments of the shelving columns (2, 3), are provided with respectively at least one recess (11, 12), through which, in the region of the feed or removal opening (13) of the shelving, parts (20) of an auxiliary conveyor (21) can be brought into engagement with objects (22) deposited on the shelf-racks (7) so as to load or unload these objects.

16 Claims, 2 Drawing Sheets

5,599,154

HIGH-RISE SHELVING

BACKGROUND OF THE INVENTION

The invention relates to a high-rise shelving having two shelving columns exhibiting compartments disposed one above the other, of which at least one shelving column is provided with a feed or removal opening and between which shelving columns there is disposed a vertical conveyor which forms a unit with them and exhibits a horizontal conveying mechanism by means of which a shelf-rack can respectively be transferred from the region of the feed or removal opening into a compartment controlled by the vertical conveyor or, indeed, can be removed from a compartment and, following return guidance into the region of the feed or removal opening, can be conveyed by the vertical conveyor, from its platform, into the region of the feed or removal opening.

In a high-rise shelving of the above type, known from DE 42 33 688 A1, the shelf-racks used as stock containers exhibit a continuous base and a wall which extends upwards from this and limits the loading area and which prevents the loading stock from slipping down from the loading surface. On the shelf-racks, according to requirement, different products can either be deposited directly or, indeed, in containers, the feeding of the shelf-racks or the removal of objects taking place either in the region of the feed or removal opening or, indeed, at a spot remote from the high-rise shelving to which the shelf-racks, together with the loading stock, have been forwarded by means of a suitable conveyor system. In the last-named case, the known solution cannot prove satisfactory where, for example, there are deposited side by side on a shelf-rack a plurality of objects of which, at a spot which is distant from the shelving, only one is required, or where an individual container or object deposited on the shelf-rack is able to be transported without a shelf-rack in a conveyor or distribution system connected downstream of the high-rise shelving. Starting from this recognition, the object of the invention is to configure a high-rise shelving of the considered generic type such that, in the region of its feed or removal opening, the shelf-racks can be loaded and unloaded automatically. This object is achieved according to the invention by virtue of the fact that the bases of the shelf-racks are provided with at least one recess, through which, in the region of the feed or removal opening, parts of an auxiliary conveyor can be brought into engagement with objects deposited on the shelf-racks so as to load or unload these objects singly or plurally.

SUMMARY OF THE INVENTION

The high-rise shelving according to the invention offers, inter alia, the advantage that the number of necessary shelf-racks depends purely and simply upon the capacity of the high-rise shelving and that downstream of the high-rise shelving there can be connected conveyor or distribution systems, the dimensions of which can be matched to the dimensions, which are regularly smaller than the dimensions of the shelf-racks, of the objects to be mounted on the shelf-racks, thereby minimizing the costs of the conveyor or distribution systems.

BRIEF DESCRIPTION OF THE DRAWINGS

Further details and features of the invention are derived from the subclaims, the appended drawing and the following description, in which drawing:

DESCRIPTION OF THE BEST MODES FOR CARRYING OUT THE INVENTION

Figure 1:
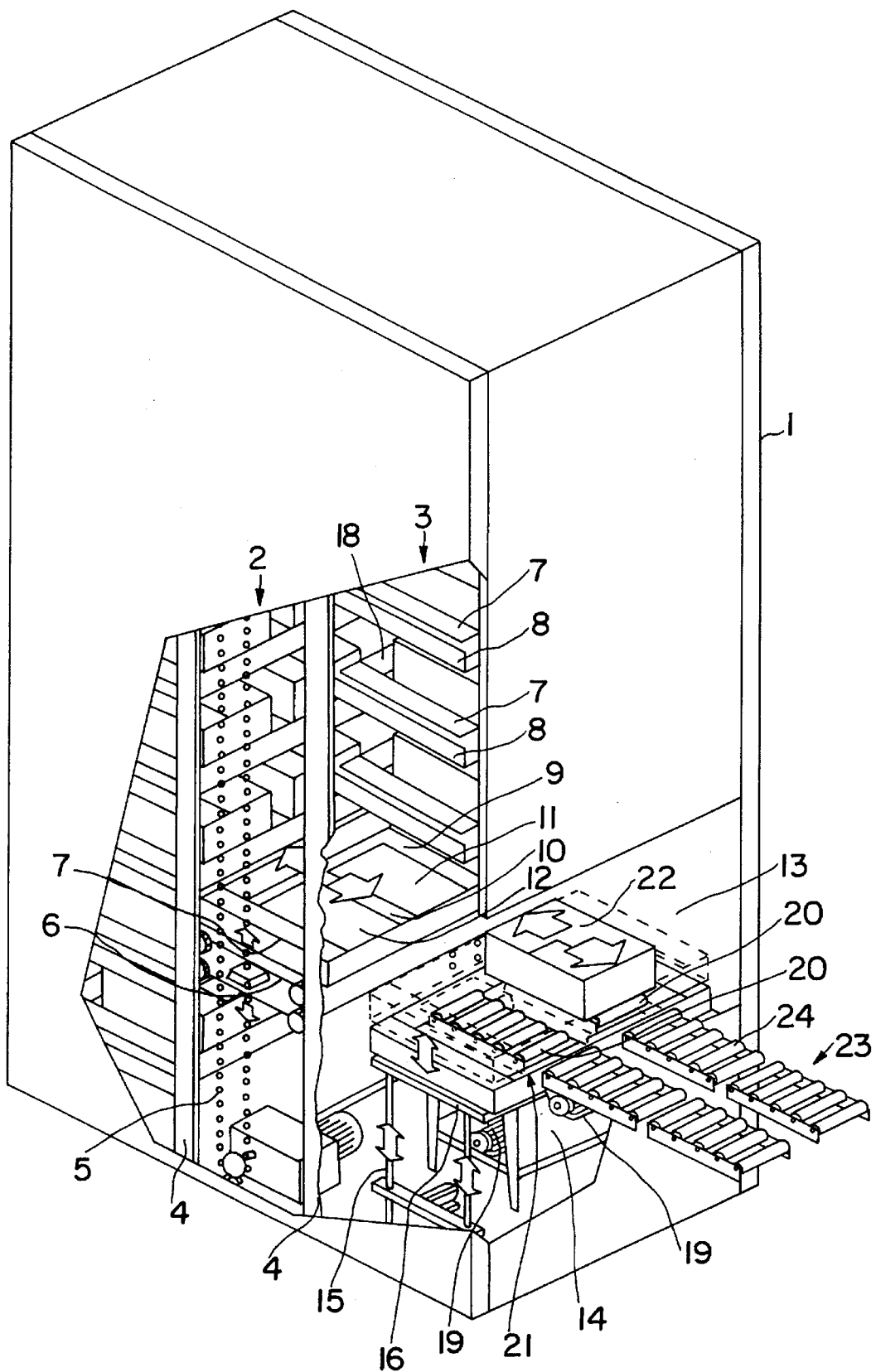
FIG. 1 shows the perspective view of a high-rise shelving and of a conveyor system coupled thereto.

In FIG. 1, 1 is the housing of the high-rise shelving having shelving columns 2 and 3, between which there is disposed, such that it can be moved up and down on guide rails 4, a vertical conveyor 6 driven by a chain 5. The vertical conveyor 6 is provided in a known manner (not represented in the drawing) with a horizontal conveying mechanism, by which the shelf-racks 7 can be transferred either from the platform of said vertical conveyor into the compartments of the shelving columns or from these onto the platform. The horizontal conveying mechanism is equipped for this purpose with two mutually spaced chains to which—as known from DE 42 33 690 A1—carriers are attached, by means of which to-and-fro motions are-able to be induced in the shelf-racks 7.

The individual compartments of the shelving columns 2 and 3 are formed by supporting rails 8, which are respectively arranged in pairs and support the shelf-racks 7 on mutually opposing sides.

The bases 9 of the shelf-racks 7 are not closed but, in the represented embodiment, exhibit two recesses 11 and 12 separated from each other by a crossbar 10.

Figure 2:
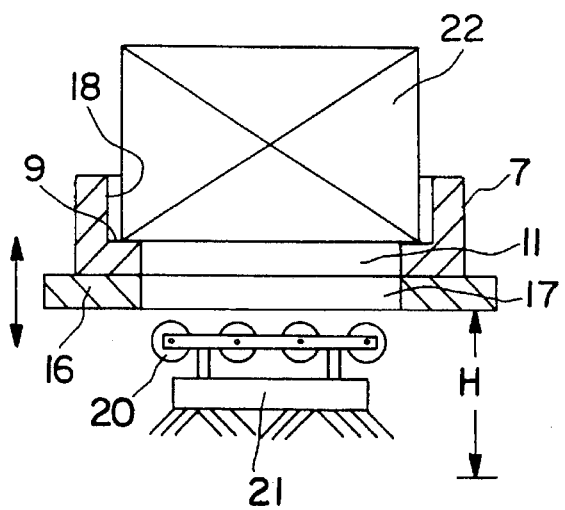
FIGS. 2–5 show diagrammatically two options for the interplay between a shelf-rack and the auxiliary conveyor of the high-rise shelving according to FIG. 1.
Figure 3:
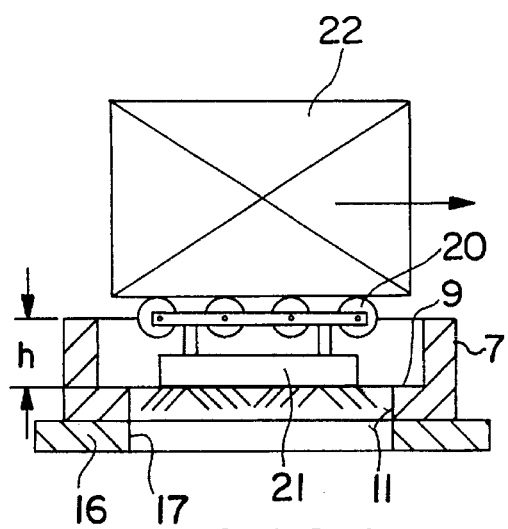

Whilst the shelving column 2 extends essentially from the base of the housing 1 up to its upper end, the shelving column 3 is of shortened configuration so as to create space for a feed or removal opening 13 equipped with a lifting table 14, whose slab 16, which can be moved up and down by means of spindles 15, exhibits recesses which correspond to the recesses 11 and 12 and of which there is represented, in FIGS. 2 and 3, a recess 17 aligned with the recess 11.

By lowering the slab 16 by an amount H which is greater than the height h of the wall 18 extending upwards from the base 9 of the shelf-rack 7, the rollers 20 of two mutually adjacent roller tracks of an auxiliary conveyor 21, which rollers can be driven by motors 19, can be brought into engagement with an object 22 deposited on the shelf-rack 7, so that said object can be transferred by the auxiliary conveyor 21 onto a conveyor system 23 which is connected downstream of the high-rise shelving and the likewise driven rollers 24 of which lie essentially in a plane with the rollers 20 of the auxiliary conveyor. By reversing the direction of rotation of the rollers 24 and 20, an object can, of course, be loaded onto the high-rise shelving in the same way. The auxiliary conveyor (21) can be formed from a plurality of part-conveyors which can be driven independently from one another.

Figure 4:
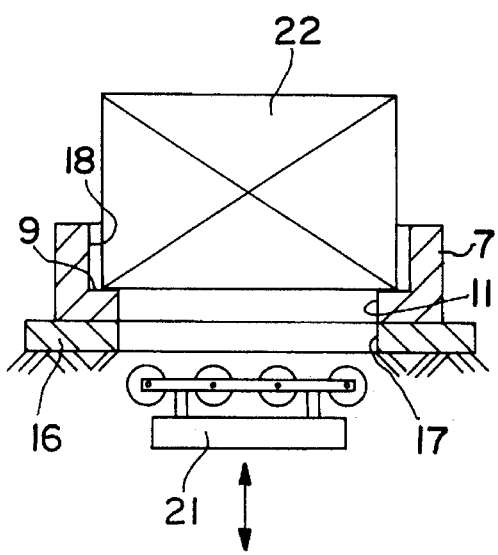
Figure 5:
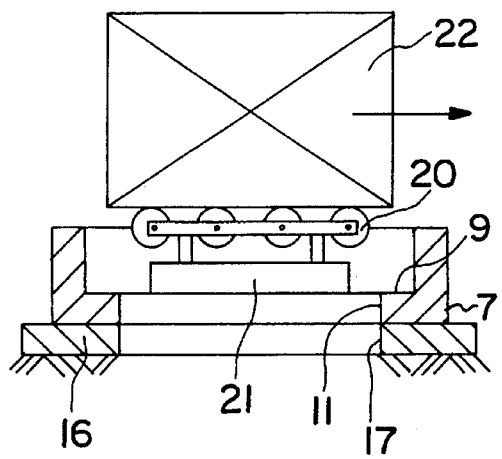

Instead of moving the slab 16 of the lifting table 14 up and down, as in the case of the embodiment according to FIGS. 1 to 3, it is also possible, as represented in FIGS. 4 and 5, for the feed or removal opening 13 to be equipped with a stationary slab 16 and with an auxiliary conveyor 21 which can be moved up and down.

We claim:

1. A high-rise shelving having two shelving columns exhibiting compartments disposed one above the other, of which at least one shelving column is provided with a feed and removal opening and between which shelving columns there is disposed a vertical conveyor which forms a unit with them, said vertical conveyor comprising a horizontal conveying mechanism forming a platform for shelf-racks, which are to be transferred individually from the region of the feed and removal opening into a compartment of one of the columns or from said compartment to the region of the feed and removal opening instead by said vertical conveyor and said horizontal conveying mechanism, and an auxiliary conveyor, wherein the shelf-racks are provided with bases having at least one recess forming a passage arranged in the region of the feed and removal opening for independently movable parts of said auxiliary conveyor, said independently movable parts of the auxiliary conveyor serving to singularly or plurally load or unload objects deposited on the bases of the shelf-racks.

2. The high-rise shelving as claimed in claim 1, wherein the auxiliary conveyor (21) and/or the shelf-rack (7) which is respectively transferred into the region of the feed and removal opening (13) can be moved up and down by limited amounts.

3. The high-rise shelving as claimed in claim 2, wherein the shelf-racks (7) are provided with a wall (18) which limits their loading surface (9) and the height (h) of which is less than the amount (H) of the possible relative motion between the auxiliary conveyor (21) and at least one of the shelf-racks (7).

4. The high-rise shelving as claimed in claim 2, wherein the auxiliary conveyor (21) is configured as a roller conveyor.

5. The high-rise shelving as claimed in claim 2, wherein the auxiliary conveyor (21) forms a bridge between the shelf-racks (7) and a conveyor system (23).

6. The high-rise shelving as claimed in claim 2, wherein the auxiliary conveyor (21) comprises a plurality of part-conveyors which can be driven independently from one another.

7. The high-rise shelving as claimed in claim 2, further including a table having a slab (16) for supporting the shelf-racks (7), said slab (16) of said table is disposed in the region of the feed and removal opening (13), which slab is provided with at least one recess (17).

8. The high-rise shelving as claimed in claim 7, wherein the auxiliary conveyor (21) can be moved up and down.

9. The high-rise shelving as claimed in claim 1, wherein the auxiliary conveyor (21) is configured as a roller conveyor.

10. The high-rise shelving as claimed in claim 1, wherein the auxiliary conveyor (21) forms a bridge between the shelf-racks (7) and a conveyor system (23).

11. The high-rise shelving as claimed in claim 1, wherein the auxiliary conveyor (21) comprises a plurality of part-conveyors which can be driven independently from one another.

12. The high-rise shelving as claimed in claim 1, further including a table having a slab (16) for supporting the shelf-racks (7), said slab (16) of said table is disposed in the region of the feed and removal opening (13), which slab is provided with at least one recess (17).

13. The high-rise shelving as claimed in claim 12, wherein the table is configured as a lifting table (14).

14. The high-rise shelving as claimed in claim 12, wherein the auxiliary conveyor (21) can be moved up and down.

15. The high-rise shelving as claimed in claim 1, further including a table having a slab for supporting the shelf-racks (7), said slab (16) of said table is disposed in the region of the feed and removal opening (13).

16. The high-rise shelving as claimed in claim 15 wherein the table is configured as a lifting table (14).

* * * * *